(12) United States Patent
Nishi

(10) Patent No.: US 8,442,101 B2
(45) Date of Patent: May 14, 2013

(54) TONE SIGNAL DETECTION APPARATUS

(75) Inventor: Hirofumi Nishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1744 days.

(21) Appl. No.: 11/806,835

(22) Filed: Jun. 4, 2007

(65) Prior Publication Data

US 2008/0158617 A1    Jul. 3, 2008

(30) Foreign Application Priority Data

Jun. 9, 2006 (JP) ................. 2006-161466

(51) Int. Cl.
*H04B 3/46* (2006.01)
*H04B 17/00* (2006.01)
*H04Q 1/20* (2006.01)

(52) U.S. Cl.
USPC .......................... 375/224; 375/340

(58) Field of Classification Search .............. 375/224, 375/324, 340; 370/203–211
See application file for complete search history.

(56) References Cited

U.S. PATENT DOCUMENTS

| | | | | |
|---|---|---|---|---|
| 4,016,371 A | * | 4/1977 | Hammad | 379/283 |
| 5,168,519 A | * | 12/1992 | Scarinci et al. | 380/253 |
| 5,239,570 A | * | 8/1993 | Koster et al. | 379/45 |
| 6,021,183 A | * | 2/2000 | Yoshida | 379/93.08 |
| 7,038,800 B2 | | 5/2006 | Ono et al. | |
| 2007/0036206 A1 | | 2/2007 | Tokuda et al. | |

FOREIGN PATENT DOCUMENTS

| | | |
|---|---|---|
| JP | 2001-307266 A | 11/2001 |
| JP | 2002-190831 A | 7/2002 |
| JP | 2002-290505 | 10/2002 |

\* cited by examiner

*Primary Examiner* — Curtis Odom
(74) *Attorney, Agent, or Firm* — Dickstein Shapiro LLP

(57) ABSTRACT

A tone signal detection apparatus for detecting a tone signal of a specific frequency is disclosed. The tone signal detection apparatus includes a detecting unit, a determining unit, a time measuring unit, and a time comparing unit. A time during which a signal is not detected by the detecting unit is measured by the time measuring unit, the measured time is compared with a predetermined threshold value by the time comparing unit, and the determining unit determines that signal detection is successful if the measured time is not in excess of the predetermined threshold value.

3 Claims, 3 Drawing Sheets

TONE SIGNAL DETECTION APPARATUS

BACKGROUND OF THE INVENTION

1. Field of the Invention

The present invention relates to a tone signal detection apparatus for detecting a tone signal of a specific frequency.

2. Description of the Related Art

With communication apparatuses such as a modem and a facsimile apparatus, various tone signals are detected in advance of starting communications after circuit connection. For data communications on a telephone network, an international standard has been agreed to as ITU-T recommendation series V, wherein V.8 provides for a standard starting procedure for a data transmission session.

According to the V.8 procedure, a terminal on the call arriving side (receiving terminal) transmits an ANSam signal (deformed response tone) to a terminal on the call originating side (calling terminal) as soon as a circuit connection is established. When the calling terminal receives the ANSam signal, the calling terminal transmits a CM (Call Menu) signal that contains information about functions of the calling terminal. When the CM signal is received during ANSam signal transmission, the receiving terminal transmits a JM (Joint Menu) signal that contains information about functions of the receiving terminal.

By exchanging the signals as described above, the V.8 procedure moves on to a next phase of the communication such as V.29. For example, if the calling terminal desires to start facsimile communications, and if the receiving terminal is capable of the facsimile communications, communications that follow a TC protocol and ITU-T T.30 recommendation are carried out.

The ANSam signal is made of a 2100 Hz sinusoidal wave, the phase of which sinusoidal wave is reversed at 450 ms intervals, and the sinusoidal wave is amplitude-modulated by 15 Hz. On the other hand, a low-speed receiving terminal discernment (CED) is a 2100 Hz sinusoidal wave.

The calling terminal determines that an ANSam signal is received if both the 2100 Hz signal and the 15 Hz signal are detected, and determines that a CED signal is received if only the 2100 Hz signal is detected.

According to Patent Reference 1, the 2100 Hz signal is detected by a tone detector that is firmware including a DSP (Digital Signal Processor).

A down sampling circuit is provided in front of the tone detector, wherein an input signal is down-sampled, and the down-sampled signal is provided to the tone detector so that a signal of a specific frequency is detected.

For example, the ANSam signal is detected by an envelope of the amplitude-modulated 2100 Hz tone.

[Patent Reference 1] JPA 2002-290505

DISCLOSURE OF THE INVENTION

Objective of the Invention

However, when the phase of the 2100 Hz signal is reversed, the 2100 Hz signal may temporarily become undetectable. For this reason, with the conventional ANSam signal detector, the envelope of the amplitude-modulated signal is disturbed, the ANSam signal has to be detected once again, and it takes time.

That is, there is a period during which detection of the ANSam signal cannot be properly carried out.

As described above, if a facsimile apparatus includes the conventional tone signal detector, presence of the ANSam signal may be falsely determined; that is, it may be falsely determined that the receiving terminal does not provide the ANSam signal. This poses a problem in that the V.8 procedure cannot be carried out, the subsequent V.34 communications cannot be performed, and facsimile communications cannot be performed.

SUMMARY OF THE INVENTION

The present invention provides a tone detecting apparatus that substantially obviates one or more of the problems caused by the limitations and disadvantages of the related art.

Specifically, the present invention may provide a tone signal detection apparatus that is capable of properly detecting a tone signal of a specific frequency even if a phase of the tone signal is reversed.

Features of embodiments of the present invention are set forth in the description that follows, and in part will become apparent from the description and the accompanying drawings, or may be learned by practice of the invention according to the teachings provided in the description. Problem solutions provided by an embodiment of the present invention may be realized and attained by a tone signal detection apparatus particularly pointed out in the specification in such full, clear, concise, and exact terms as to enable a person having ordinary skill in the art to practice the invention.

To achieve these solutions and in accordance with an aspect of the invention, as embodied and broadly described herein, an embodiment of the invention provides a tone signal detection apparatus as follows.

Means for Solving a Problem

The tone signal detection apparatus for detecting a tone signal of a specific frequency according to the embodiment includes a time measuring unit for measuring a time during which a tone signal is not detected, and a time comparing unit for comparing the time during which the tone signal is not detected with a predetermined threshold value, wherein the time comparing unit determines that the tone signal is detected if the measured time is less than the threshold value.

According to an aspect of the embodiment of the present invention, the tone signal detection apparatus includes
 a tone signal detection starting/stopping unit,
 a tone signal detection result notifying unit, and
 a predetermined threshold value changing unit.

According to another aspect of the embodiment, the tone signal is an ANSam signal specified by ITU-T recommendation V.8 procedure.

Effectiveness of Invention

According to the embodiment, the tone signal detection apparatus for detecting the tone signal of a specific frequency properly detects the tone signal even if the phase of the tone signal is reversed.

DESCRIPTION OF THE PREFERRED EMBODIMENTS

In the following, embodiments of the present invention are described with reference to the accompanying drawings.

Figure 1:
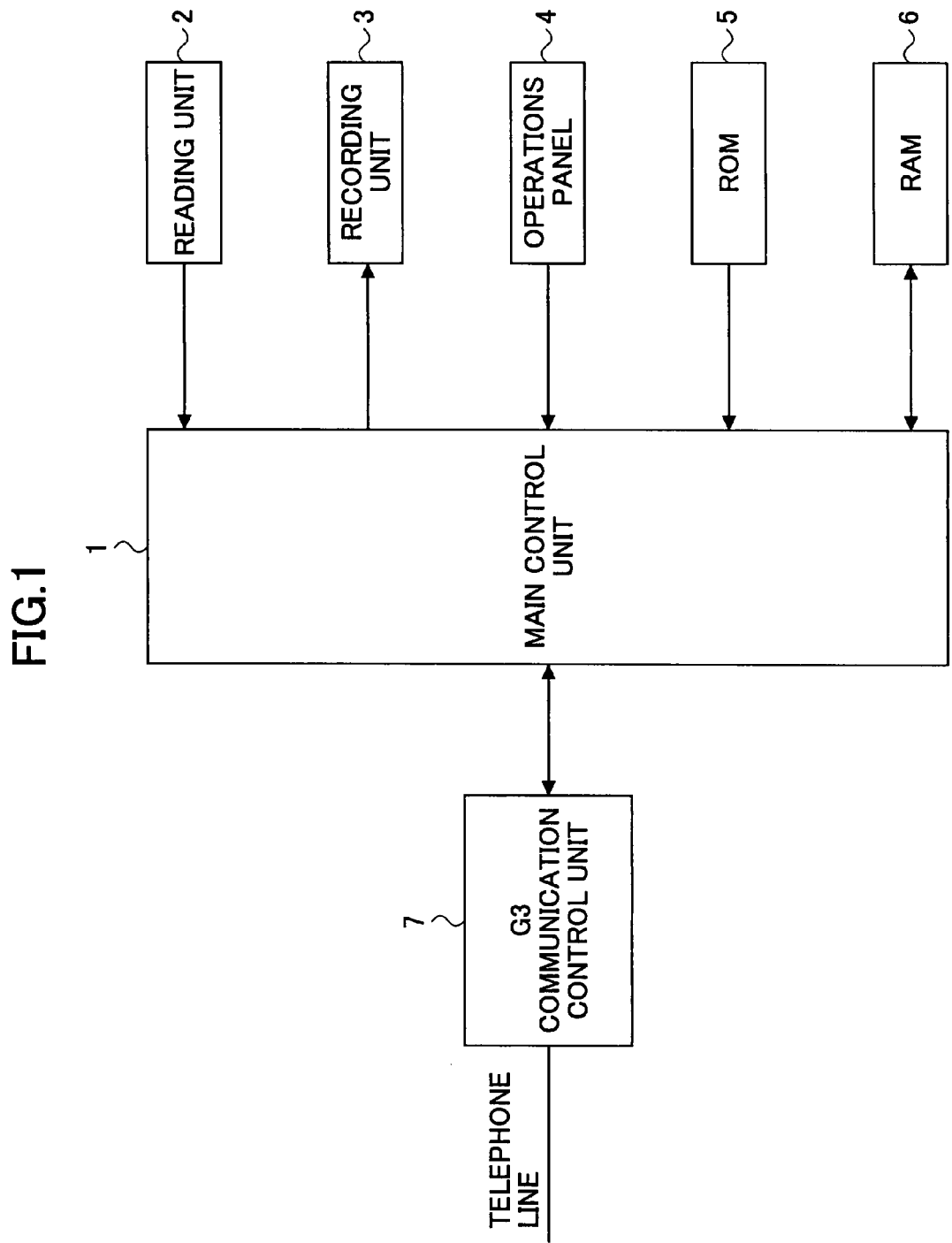
FIG. 1 is a block diagram of a multifunction machine (MFP) according to an embodiment of the present invention, which multifunction machine is capable of facsimile communications.

FIG. 1 is a block diagram of a multifunction machine (MFP) according to the embodiment, which MFP is capable of facsimile communications.

The multifunction machine includes a main control unit 1 for controlling the multifunction machine, a reading unit 2 connected to the main control unit 1 for reading a manuscript, a recording unit 3 connected to the main control unit 1 for recording (printing) image data received by the facsimile communications, and the image data read by the reading unit 2, an operations panel 4 connected to the main control unit 1 for a user to operate the multifunction machine, a ROM 5, a RAM 6, and a G3 communication control unit 7.

The main control unit 1 is, for example, a CPU and controls operations of the reading unit 2, the recording unit 3, the operations panel 4, and the G3 communication control unit 7 according to a program stored in the ROM 5 for controlling the multifunction machine. Information for operational control is temporarily stored by the RAM 6.

The reading unit 2 is, for example, a scanner. The recording unit 3 is, for example, a printer, a plotter, and a HDD. The operations panel 4 is, for example, a console panel attached to the multifunction machine.

The G3 communication control unit 7 is connected to a telephone line and performs facsimile communications according to a Group 3 specification standardized by ITU-T, wherein a document signal from which redundant information is deleted is used.

The G3 communication control unit 7 receives, analyzes, and demodulates a tone signal provided through the telephone line. Further, the G3 communication control unit 7 receives communication data from the main control unit 1, modulates the communication data, and a communications process is performed.

The function of G3 communication control unit 7 is described in more detail with reference to FIG. 2.

The G3 communication control unit 7 includes a tone signal detection apparatus 8, a NCU (network control unit) 9, and a modem 10.

The NCU 9 controls connection to and disconnection from the telephone line, sends out a dial pulse or MF tone for dialing, as applicable, and detects arrival of a call. The NCU 9 may contain the modem 10; however, according to this embodiment, the modem 10 is made into a separate entity.

The modem 10 modulates digital data into an analog signal, and demodulates an analog signal to digital data.

The tone signal detection apparatus 8 includes a detecting unit 11, a determining unit 12, a control unit 13, a time measuring unit 14, and a time comparing unit 15.

When the multifunction machine sends digital data to the telephone line, the main control unit 1 provides the digital data to the modem 10 for modulation into an analog signal, and the analog signal is output to the telephone line through the NCU 9.

On the contrary, when the NCU 9 receives a signal from the telephone line, the signal is provided to the detecting unit 11 of the tone signal detection apparatus 8 and the modem 10. The signal provided to the modem 10 is demodulated into digital data by the modem 10 and the digital data are provided to the main control unit 1.

The detecting unit 11 detects a specific tone signal, and detects an ANSam signal according to the embodiment. Specifically, a 2100 Hz tone signal and a 15 Hz amplitude modulation are detected.

The determining unit 12 acquires a detection result of the detecting unit 11, controls start and stop of a time measurement start by the time measuring unit 14, and acquires a truth value of time comparison of the time comparing unit 15 such that a final determination as to presence of an ANSam signal is carried out. The determination result is provided to the control unit 13.

The control unit 13 controls the tone signal detection apparatus 8. The control unit 13 controls start and stop timings of signal detection, and sets a non-detection decision time T. According to the embodiment, the control unit 13, under control of the main control unit 1, directs the determining unit 12 to start detection; then directs the determining unit 12 to stop the detection after a while; and receives a determination result from the determining unit 12. The determination result is provided to the main control unit 1. In this way, the tone signal detection result is reported. Further, the control unit 13 receives the non-detection decision time T from the main control unit 1, and directs the determining unit 12 to set the non-detection decision time T in the time comparing unit 15.

The time measuring unit 14 is a timer that runs by commands from the determining unit 12. The commands include an initialization command, a start command, and a stop command. The initialization command resets the timer. The start command starts the timer. The stop command stops the timer. If a query for time is received from the time comparing unit 15, the time measured by that time point is provided.

The time comparing unit 15 receives a query for a truth value of the comparison from the determining unit 12, compares the time measured by the time measuring unit 14 with the set non-detection decision time T, and provides the truth value to the determining unit 12. Further, if a new non-detection decision time Ta is provided by the determining unit 12, the non-detection decision time T is updated to take the value Ta.

Next, operations of the tone signal detecting apparatus 8 according to the embodiment are described. Here, an example of detecting an ANSam signal of the V.8 procedure is described with reference to FIG. 3.

Figure 3:
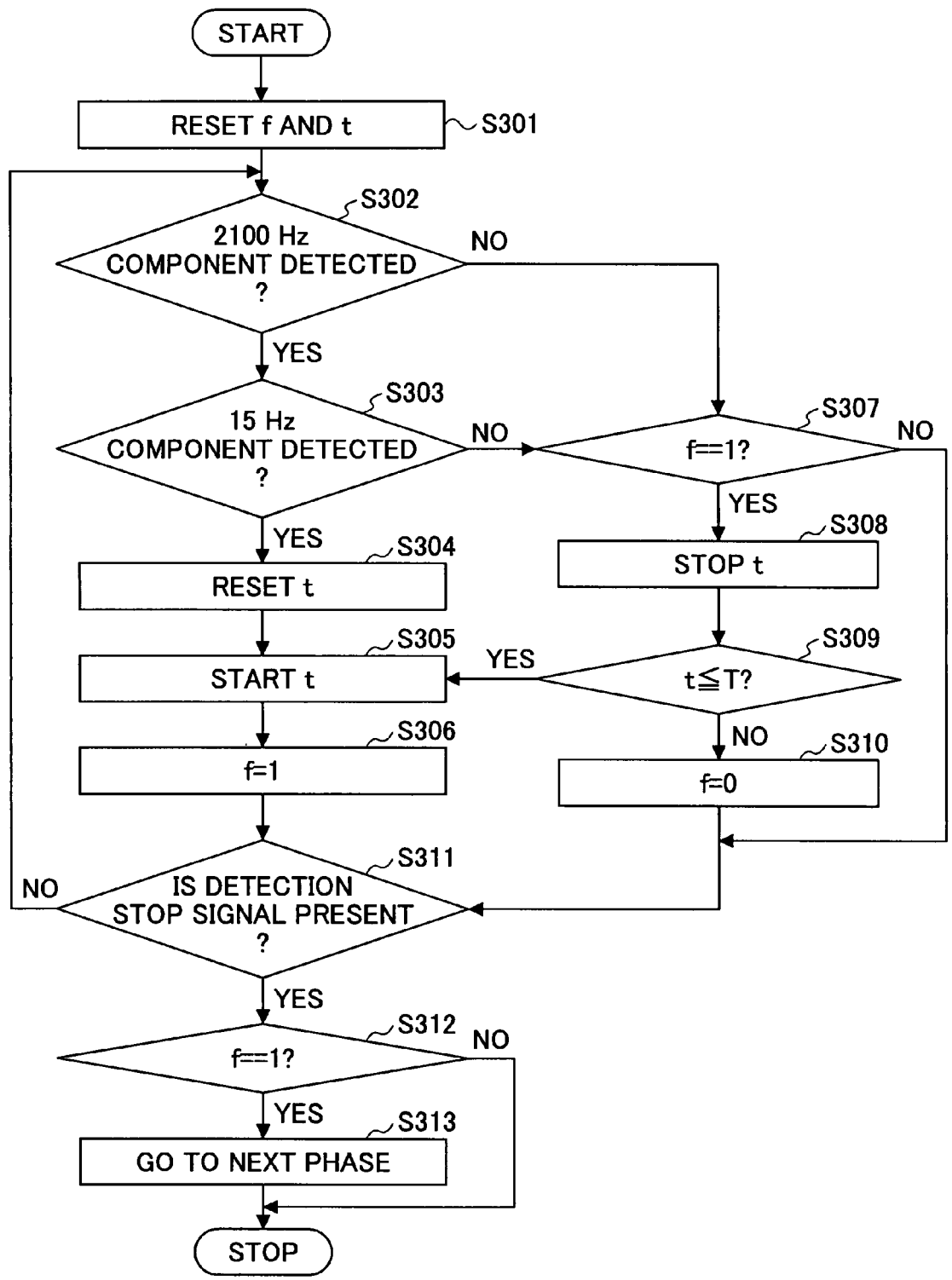
FIG. 3 is a flowchart of the embodiment.

Variables and operators used in FIG. 3 are described. A detection flag of the determining unit 12 is expressed by "f"; and the non-detected time of the time measuring unit 14 is expressed by "t". The non-detection decision time of the time comparing unit 15, expressed by "T", serves as a threshold value T. Further, an operator "==" is to compare; and an operator "=" is to assign to a left-hand side variable a right-hand side value.

When a circuit connection is established, a receiving terminal transmits an ANSam signal to a calling terminal, and the V.8 procedure starts. If a certain signal is received from the telephone line (note that at this timing, it is unknown whether the signal is an ANSam signal), the NCU 9 reports that a certain signal arrives to the control unit 13, and distributes the signal to the detecting unit 11. The control unit 13 having received the report sends a detection start signal so that the determining unit 12 starts the ANSam signal detection.

With reference to FIG. 3, at step S301, an initialization process is carried out. The determining unit 12, having received the detection start signal from the control unit 13, clears the detection flag f to zero, and provides the initialization command to the time measuring unit 14 so that the non-detected time t of the time measuring unit 14 is cleared to zero.

At step S302, whether the detecting unit 11 detects a 2100 Hz signal component of an ANSam signal is determined. At step S303, whether the detecting unit 11 detects a 15 Hz amplitude-modulation component is determined.

Figure 2:
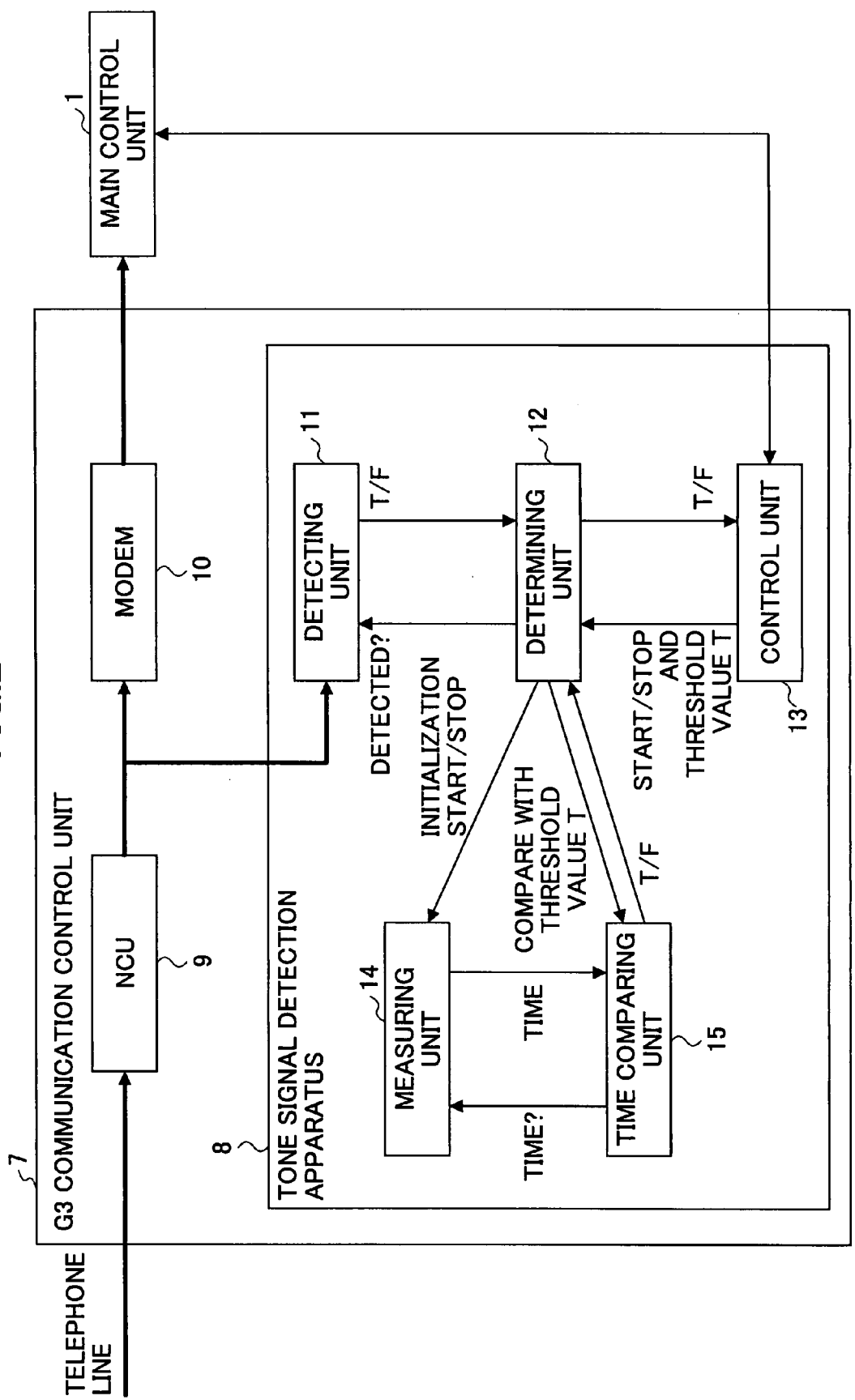
FIG. 2 is a block diagram of a G3 communication control unit 7 according to the embodiment.

Although detections of the 2100 Hz signal and the 15 Hz component are separately expressed in FIG. 3, an "AND" value expressing True or False (T/F) of the two detections may be provided from the detecting unit 11 to the determining unit 12 as shown in FIG. 2.

If True, the process proceeds to step S304. Otherwise, that is, if at least one is False, the process proceeds to step S307.

If both 2100 Hz signal and 15 Hz amplitude-modulation component are detected, the determining unit 12 initializes the non-detected time t of the time measuring unit 14 at step S304, then immediately starts measurement at step S305, and sets the detection flag f of the determining unit 12 to 1 at step S306.

At step S311, the determining unit 12 determines whether a detection stop signal is provided by the control unit 13. If affirmative (Yes at step S311), the process proceeds to step S312, wherein the truth value of the detection flag f is acquired and provided to the control unit 13. That is, the final determination of the detection result (determination whether the signal is detected or non-detected) of the tone signal by the tone signal detection apparatus 8 is made by the determining unit 12. The final determination is provided to the control unit 13.

If the determination is negative (No at step S311), the control flow returns to step S302, and repeats the detection process.

If the detection result is affirmative, i.e., f=1, the control unit 13 reports the fact to the main control unit 1, and the next phase of the V.8 procedure starts at step S313. Otherwise, if the value of f is 0, that fact is reported to the main control unit 1 according to the embodiment; however, this process can be dispensed with so that no action is taken.

If at least one of the results of steps S302 and S303 is negative, the process proceeds to step S307. At S307, the determining unit 12 determines the value of the detection flag f. If the value f is 0, the process proceeds to step S311 without further processing. If the value f is 1, the determining unit 12 directs the time measuring unit 14 to stop measurement at step S308.

Then, it is determined whether the non-detected time t is less than the predetermined threshold value T (non-detection decision time T) at step S309. If the determination is affirmative (Yes at step S309), the process proceeds to step S305. If the determination is negative (No at step S309), the process proceeds to step S310, the detection flag f is set to 0, and whether the detection stop signal is present is determined at step S311.

The operations of the tone signal detection apparatus according to the embodiment are as described above.

In summary, there are at least four possible flow combinations of steps S302 through S311 as follows.

Flow (1) S302-S306, S311
Flow (2) S302, S307-S309, S305, S306, S311
Flow (3) S302, S307-S311
Flow (4) S302, S307, S311

Flow (1) is the case where the ANSam signal is normally detected.

Flow (2) is the case where the 15 Hz envelope is not detected when the phase of the 2100 Hz tone signal is reversed. Although detection of the signal is not successful, since the non-detected time t is smaller than the non-detection decision time T, the determining unit 12 determines that the signal is present.

Flow (3) is the case where the non-detected time t has exceeded the non-detection decision time T, and for this reason, it is determined that the signal is not present.

Flow (4) represents one of the cases where no signal is detected after detection is started, and the non-detection decision time T sharply exceeds the non-detection decision time T through Flow (3) even if a signal is once detected. If the detecting unit 11 cannot detect the ANSam signal for a long time after the non-detection decision time T, it is considered that transmission of the ANSam signal from the receiving terminal has already finished.

According to the embodiment, the non-detection decision time T, which is a predetermined threshold value, can be changed into a desired value.

The control unit 13 receives a new value of the non-detection decision time T desired by the user from, e.g., the main control unit 1, and passes the T to the determining unit 12. The determining unit 12 passes the T to the time comparing unit 15 for resetting.

Of course, the T may be set in the time comparing unit 15 by direct control from the control unit 13. However, it is more efficient if the determining unit 12 controls the time comparing unit 15.

Although the control unit 13 is provided for controlling the tone signal detection apparatus 8, the control unit 13 may be dispensed with, in which case the main control unit 1 directly controls the tone signal detection apparatus 8.

Although a special filter, a special down sampling circuit, and the like are not installed between the NCU 9 and the detecting unit 11 according to the embodiment described above, an echo removal filter and a down sampling circuit may be provided like Patent Reference 1 described above such that a system that is stronger against communication noise may be built, and such that the amount of calculation may be sharply decreased.

According to the embodiment, the ANSam signal determining unit (the determining unit) is provided in the latter stage of the ANSam signal detector (the detecting unit) wherein the result of not the detecting unit but the determining unit is appropriately controlled. In this way, the accuracy of ANSam signal detection is improved, and communications of the V.8 procedure are properly handled.

Further, according to the embodiment, the non-detected time t of the tone signal detection apparatus 8 can be changed from the outside. For this reason, proper communications are possible by adjustment of the non-detected time t, even if the ANSam signal non-detected time varies with a countering machine or circuit situations.

Further, the present invention is not limited to these embodiments, but variations and modifications may be made without departing from the scope of the present invention.

The present application is based on Japanese Priority Application No. 2006-161466 filed on Jun. 9, 2006 with the Japanese Patent Office, the entire contents of which are hereby incorporated by reference.

What is claimed is:

1. A tone signal detection apparatus, comprising:
a detecting unit configured to detect a tone signal;
a determining unit configured to receive a detection result from the detecting unit and determine whether the tone signal is present;
a control unit configured to control the determining unit to start and stop tone signal detection;
a time measuring unit configured to measure time during which the tone signal is not detected when a start command is received from the determining unit; and
a time comparing unit configured to compare the measured time with a predetermined threshold value;
wherein the determining unit is configured to determine that the tone signal is present if the measured time is less than the threshold value and report the determination result to the control unit; and
wherein the determining unit is configured to change the threshold value set in the time comparing unit.

2. The tone signal detection apparatus as claimed in claim 1, wherein the tone signal is an ANSam signal specified in a V.8 procedure of an ITU-T recommendation.

3. The tone signal detection apparatus as claimed in claim 1, wherein the tone signal is obtained by amplitude-modulating a first signal component having a first frequency by a second frequency component having a second frequency; and
wherein the determining unit is configured to cause the time measuring unit to start measuring the time when both of the first signal component and the second signal component are detected by the detecting unit and cause the time measuring unit to stop measuring the time when at least one of the first signal component and the second signal component is not detected by the detecting unit.

* * * * *